United States Patent [19]

Burg

[11] Patent Number: 5,181,580
[45] Date of Patent: Jan. 26, 1993

[54] CYCLICAL VARIABLE APERTURE VALVE FOR AIR CUSHION VEHICLES

[76] Inventor: Donald E. Burg, 15840 SW. 84 Ave., Miami, Fla. 33157

[21] Appl. No.: 475,708

[22] Filed: Feb. 6, 1990

[51] Int. Cl.⁵ .................. B60V 1/00; F16K 3/04; F16K 3/08
[52] U.S. Cl. .................. 180/116; 137/625.3; 137/625.31; 137/625.32; 180/117; 181/114; 181/116; 251/129.11; 251/208; 251/209; 251/212
[58] Field of Search .............. 180/126, 127, 128, 116, 180/117; 114/289; 251/212, 208, 209, 129.11; 137/625.3, 625.31, 625.32; 181/114, 116, 119

[56] References Cited

U.S. PATENT DOCUMENTS

| | | |
|---|---|---|
| 2,443,071 | 6/1948 | Honerkamp et al. ............ 137/625.3 |
| 2,449,833 | 9/1948 | Barnes .................. 251/209 |
| 3,068,891 | 12/1962 | Panning et al. ............... 251/212 |
| 3,349,798 | 10/1967 | Allen .................. 137/625.3 |
| 3,701,968 | 10/1972 | Broding .................. 181/114 |
| 4,116,301 | 9/1978 | Fair .................. 180/116 |
| 4,328,831 | 5/1982 | Wolf .................. 137/625.31 |
| 4,516,606 | 5/1985 | Worley .................. 137/625.3 |

FOREIGN PATENT DOCUMENTS

569780  8/1977  U.S.S.R. .................. 137/625.31

Primary Examiner—Mitchell J. Hill
Attorney, Agent, or Firm—Robert J. Van Der Wall

[57] ABSTRACT

A simple, low cost, and reliable, normally cyclic, fluid control valve that in preferred configuration includes one or more rotary valve elements where such valve elements have openings that align with each other and/or with a flow passageway thus forming an aperture for fluid flow during valve cycles. Rotary valve elements may be oriented in different directions to connecting ducts and may have a variety of shapes with a preferred shape being cylindrical. Simple motors drive rotary valve elements such that a rate of valve cycling and/or amount of aperture can be easily controlled by a controller such as a microprocessor. Easy valve servicing and installation are other features. Dynamic sealing of the fluids is preferably accomplished by use of simple low cost labyrinth seals. A primary application of this cyclic fluid control valve is for control of pulsing gas pressures in supporting gas cushions of air cushion vehicles where it may be used to vent gas cushion pressure pulses and/or control inlet gas to a pressurizing blower that supplies a gas cushion. In its primary application, to an air cushion vehicle, valve operation is normally controlled by inputs from a controller that has received inputs of gas cushion pressures, gas pressures proximal a valve, vehicle g-forces, vehicle inclinometer, and/or the like.

61 Claims, 3 Drawing Sheets

CYCLICAL VARIABLE APERTURE VALVE FOR AIR CUSHION VEHICLES

FIELD OF THE INVENTION

This invention relates to the field of cyclic fluid control valves with particular application being their use for control of pulsing gas pressures in supporting gas cushions of air cushion vehicles.

BACKGROUND OF THE INVENTION

This invention offers a simple reliable valve for, among other applications, reduction of pressure pulses in the supporting gas cushions of air cushion vehicles. It utilizes a low cost rugged design that is normally rotary in concept and that will operate for extended periods with little or not maintenance.

My Air Ride Boat Hull designs, as described in U.S. Pat. Nos. 4,392,445 and 4,739,719 among others, brought out the need for the instant invention. The Air Ride Boat Hull designs utilize a blower pressurized air cushion positioned in the underside of the hull where such pressurized air cushion supports approximately 85 percent of the weight of the boat. It is not uncommon, during normal operation in low sea states, to have an approximately two to six cycle per second (cps) pressure pulse or spike occur in the gas cushion since the cushion is in reality a large gas spring. These pressure pulses result in heave forces that act on the hull that are of significant magnitude to cause an uncomfortable ride.

As an example, the 368 passenger 109 by 34 foot "Metro Manhattan" Air Ride Surface Effect Ship (SES) Ferry built by Avondale Industries, New Orleans, that will go into operation in New York, experiences an approximate three cps pressure spiking when operating in one to two foot seas. The pressure spikes or pulses experienced can amount to approximately 40,000 pounds of force on the 340,000 pound hull during each pressure spike. This makes for an uncomfortable bouncy or what has been described as a "cobblestone" like ride for passengers. This "cobblestone" ride is characteristic of virtually all large air cushion craft, of which the Air Ride SES is a variant, when operating in small to moderate waves.

The U.S. Navy has funded work to resolve this ride problem in their SES's. The resulting solution is in the form of a Ride Control System (RCS) that is commercially manufactured in the United States. A similar system is now also manufactured in Sweden. These systems are very similar in that they sense air cushion pressures and other hull operating characteristics and feed such information into a microprocessor controller. The controller processes the input data and then outputs operating conditions to gas cushion vent valves and/or blower inlet flow control valves.

The gas cushion vent valves are operated in such manner so as to open and thereby vent pressure peaks as they occur in the air cushion. The blower inlet flow control valves accomplish essentially the same thing; however, they do so by restricting blower flow and pressure outputs in time with the pressure peaks. These on-the-market RCS's utilize valves that are made up of a series of Venetian blind type louvers that are set in a rectangular frame. The louvers can be closed to essentually shut off gas flow or operated at various degree of openess at frequencies that coincide with the pressure pulsing frequency in the air cushion.

Powered hydraulic actuators are used to operate the louvers at their required operating frequencies in both systems. Due to their inherent design characteristics, these 2 to 6 cps cycling hydraulically powered louver valves are expensive initially, largely due to the hydraulic systems, and require significant maintenance due to the two to six cps stop and start wear on joints, louvers, and hydraulic systems.

A main feature of the present invention overcomes the shortcomings of the just discussed start and stop cycling louver valves. The instant invention centers around an inherently simple and reliable cycling valve design that can be driven by low cost motors. This valve is intended to be applied mainly to control of air cushion vehicle cushion pressure pulses; however, it can be utilized wherever a need exists for a low cost reliable valve that is capable of rapid and continual cycling. The features and improvements offered by the instant invention are discussed in the following sections.

SUMMARY OF THE INVENTION

A major object of the present invention is to offer an inherently simple cycling valve design that is based, in its preferred embodiment, on a rotating valve element that can be driven by low cost motors such as synchronous electric motors. A second major object is to offer means to easily control the size of the gas flow aperture formed each time the valve cycles.

It is an object of the invention that the cycling periods of the valves can be either regular or irregular or combinations of regular and irregular as operating conditions require.

A further object of a preferred embodiment of the invention is to present a design that can be easily incorporated into a rectangular duct where rotating element drive motor(s) would preferably be positioned outside of the flow path(s) and therefore easy to service.

It is also intended as a object of the invention that any valve so described herein can have its elements positioned such that an essentially blocked flow or shutoff condition can be realized.

A further feature of the invention is the use of dynamic low leakage seals, such as non-contacting labyrinth seals, for sealing, wherever possible, to insure minimum friction losses, maximum reliability, and lowest cost.

It is also intended that any valves or portions thereof, such as drive motors, will be easy to get to for servicing.

An optional object of the invention is to offer a rotating valve that is substantially axially in line with inlet and/or outlet flow paths.

Another object is to offer a very simple valve that consists, at least partially, of simple rotatable discs with openings that align to form the fluid flow aperature during portions of their rotation.

Another major feature of the instant invention is to offer means to incorporate any of the invention's valves into a RCS for an Air Cushion Vehicle (ACV) such as an Air Ride Surface Effect Ship (SES) or Air Ride Boat Hull as it is sometimes called.

An object of the invention, in the case of installation in an ACV, is that multiple compartments can be incorporated into the ACV's gas cushion so that the different ACV supporting compartments can be equipped with the instant invention RCS thereby allowing control of pitch, roll, heave, and other characteristics of the ACV in a finely tuned way.

As a feature of the invention, it is intended that the operation of any of the invention's valves can be controlled by a microprocessor or other type controller where such controller receives inputs of such information as valve upstream and/or downstream fluid pressures, gas cushion pressures, vehicle g-forces, and vehicle orientation.

The invention will be better understood upon reference to the drawings and detailed description of the invention which follow in which:

DETAILED DESCRIPTION

With reference to each of the aforementioned Figures in turn, and using like numerals to designate similar parts throughout the several views, a preferred embodiment and several alternative embodiments will now be described.

Figure 1:
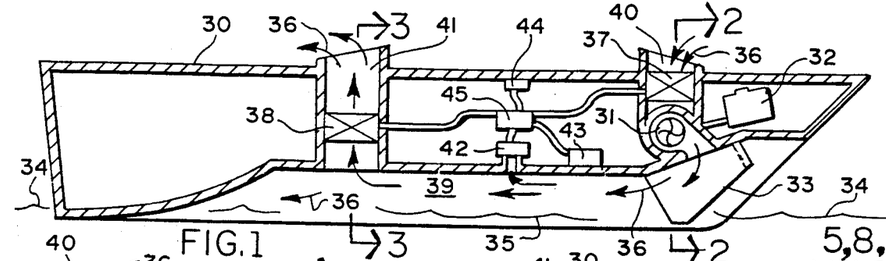
FIG. 1 presents a cross sectional view of a typical Air Cushion Vehicle (ACV), in this case an Air Ride Surface Effect Ship (SES), or Air Ride Boat Hull as it is sometimes called, to which the instant invention can be applied. Included in this view are a boat hull with supporting pressurized air cushion in its underside, a powered blower, flexible bow seals, blower inlet RCS valve, air cushion discharge RCS valve, and RCS control module or controller and its input source devices.

FIG. 1 discloses a cross sectional view of an Air Cushion Vehicle (ACV) Hull 30, which in this instance is an Air Ride Boat Hull, with the instant invention installed. Shown are a blower inlet Ride Control System (RCS) valve 37, inlet duct 40, blower 31, blower drive engine 32, hull supporting gas cushion 39, gas flow arrows 36, flexible bow seal 33, gas cushion outlet RCS valve 38, outlet duct 41, sea surface waterline 34, and gas cushion waterline 35. Also shown are a controller 45, normally a microprocessor, that can receive inputs from a gas cushion pressure transducer 42, accelerometer 43, and/or inclinometer 44. The ouputs of the controller 45 are fed into the inlet RCS valve 37 and/or the gas cushion outlet RCS valve 38. The most important input to the controller 45 is the pressure readings from the gas cushion pressure transducer 42 as that supplies information on rate and magnitude of pressure pulses in the gas cushion 39. The controller 45 analyzes the input signals and then sends output signals to the RCS valves 37,38 to open and close them in proper cycles.

Figures 2, 3:
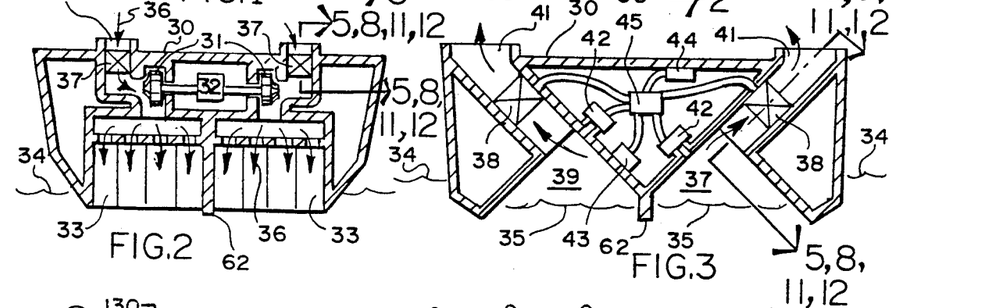
FIG. 2 is a cross sectional view, as taken through line 2—2 of FIG. 1, that shows the ACV blowers, blower inlet RCS valves, and forward flexible seals as are used in this instance.
FIG. 3 presents a cross sectional view, as taken through line 3—3 of FIG. 1 but also including an RCS control module and its input source devices, that also shows location of gas cushion vent ducts and RCS valves positioned therein.

FIG. 2 is a cutaway view, as taken through line 2-2 of FIG. 1, that shows a front portion of an ACV hull 30, blowers 31, blower drive engine 32, blower inlet ducts 40, inlet RCS valves 37, gas flow arrows 36, flexible bow seals 33, and sea surface 34. In this particular arrangement with blowers 31 and inlet RCS valves 37 positioned both port and starboard, it is possible to control blower inlet openings or apertures differently on port and starboard sides of the gas cushion 39. The gas cushion 39 can be divided, in the case of the Air Ride boat hull, by the center divider 62 or other means such as additional rows of flexible seals, now shown, that would be positioned aft of the forward row of flexible seals 33 shown.

FIG. 3 presents a cutaway view, taken through line 3-3 of FIG. 1, that illustrates a hull 30 section taken through a midship portion of the gas cushion 39. Shown are sea surface waves 34 and wave surfaces 35 that make up the lower surface of the gas cushion 39. This view also shows gas cushion vent RCS valves 38 as they are positioned in ducts 41 that are used to vent pressure pulses from the gas cushion 39. For convenience, the controller 45, pressure transducers 43, accelerometer 43, and inclinometer 44 are also shown in this view although they are actually positioned further forward in FIG. 1. In this particular variation of the Air Ride boat hull invention, a center divider 62 is used to separate port and starboard side of the gas cushion 39. This division of the gas cushion 39 offers advantages in that each side of the gas cushion 39 can be controlled separately. It is also possible to incorporate one or more additional rows of flexible seals, not shown, such as the forward row of flexible seals 33 that would divide the ACV's main gas cushion 39 into a series of longitudinally disposed smaller gas cushion portions, not shown, where such smaller gas cushion portions would also be controlled separately by incorporation of the instant invention RCS system(s).

Figure 4:
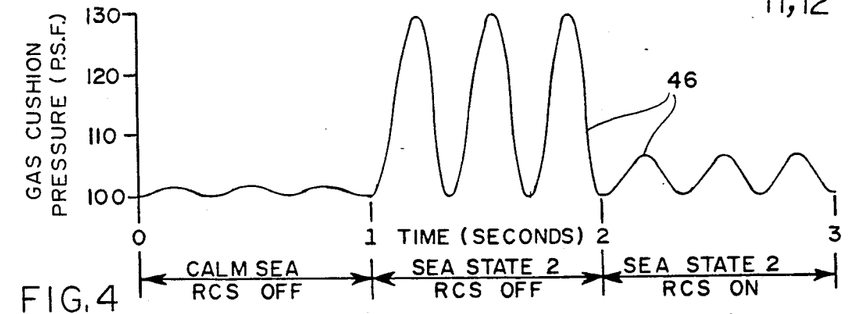
FIG. 4 presents a typical plot of pressure oscillations that occur in an ACV supporting gas cushion. This shows a typical 3 cps regular cycling or pulsing that might occur during calm water operation with or without a RCS, high amplitude regular cycling or pulsing that might occur during high speed operation in seastate 2 with no RCS, and reduced amplitude pulses that might occur with a RCS on. It is to be noted that regular or consistant cycling or pulsing is shown for illustration purposes only and it is realized that irregular intervals of cycling or pulsing can occur in actual operation conditions.

FIG. 4 presents an idealized but representative plot 46 of gas cushion pressure vs. time for several different operational conditions of a typical ACV. In each case the frequency of pressure oscillations is assumed to be three cps and at a constant rate for purposes of this illustration. It can be seen from the first second of operation in calm seas that little pressure variation occurs and a relatively constant pressure of about 100 Pounds per Square Foot (PSF) is realized. The second second shows operation in seal state 2 with the RCS off, or for an ACV with no RCS, with gas cushion pressures peaking at about 130 PSF during pressure pulses. The 30 PSF differential pressure can result in an impact force of about 60,000 pounds of force on a 300,000 pound 110 foot ACV so these pressure pulses cause noticeable impacts. The third second of operation shows the expected reduction of pressure pulse values due to having the RCS on and in operation with the ACV in sea state 2. Reductions in pressure peaks by eighty percent or move can be realized with the RCS on.

Figure 5:
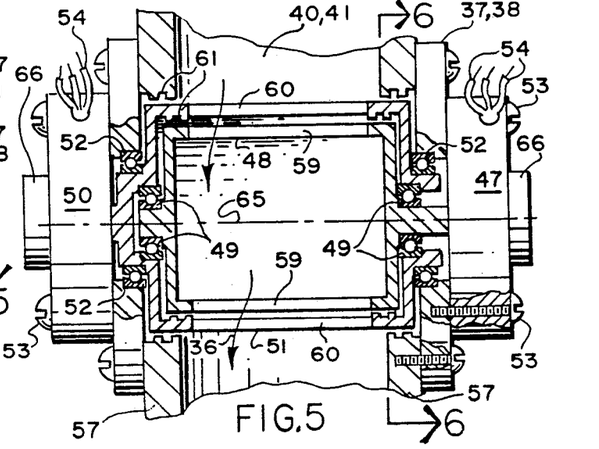
FIG. 5 shows a preferred embodiment of the instant inventive valve in a cross sectional view as taken through line 5—5 of FIGS. 2 and 3. Shows are an inner rotary member drum valve portion, outer opening size controlling rotary member drum valve portion, and drive motors for each drum. Gas is shown flowing through openings in the two drums as they are lined up in this cross sectional view.
Figure 6:
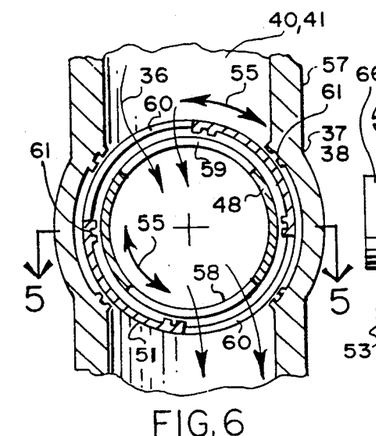
FIG. 6 is a cross sectional view as taken through line 6-6 of FIG. 5 that shows the inner and outer rotary drive member drive portions and the outer housing in which they are positioned. Note the flow direction arrows in this view which clearly show the resulting aperature when the openings in the two drum portions are partially, as in the case here, aligned.

FIG. 5 presents a preferred embodiment of a valve 37,38 to the instant invention, as taken through line 5—5 of FIGS. 2, 3, and 6, where the gas flow arrows 36 are shown entering only, as would be for the FIG. 2 gas cushion RCS vent valve 37. This was done to simplify the drawings; however, it is to be understood for this and subsequent figures that the gas flow arrows 36 could flow in either direction to allow either inflow or outflow venting through either inlet or outlet valves 37,38. In this particular valve design 37,38 substantially rectangular inlet or outlet ducts 40,41 supply gas to rotary elements 48,51. The rotary elements 48,51 have openings 59,60 that are aligned in this instance thereby creating an aperture for gas flow as is shown by the gas flow arrows 36. Since the rotary elements 48,51 are independently controllable, it is possible to set a different aperture size at will. The rate of change of position of either or both rotary elements 48,51 can either be held constant for a constant cps rate and aperture size setting or can be varied to set an irregular cps rate and/or variable aperture size setting.

The inner rotary element 48 is driven by motor 47 which receives control signals and power through leads 54, and is supported by shaft bearings 49. The outer rotary element 51 is driven by motor 50 that receives control signals and power through leads 54, and is supported by shaft bearings 52. The motors 47,50 are attached to motor mount plates 63 by fasteners 53. Motors 47,50 can be of a variety of types including electric, hydraulic, pneumatic, and the like. Motors 47,50 normally include a shaft position indicator device 66 which in its preferred embodiment is an optical encoder. Outputs of the shaft position indicator device 66 wold normally be fed into the controller of FIGS. 1 and 3.

A very important aspect of this valve design is the preferred use of labyrinth seals 61 on various portions of rotary elements 48,51 and static housing member 57. Labyrinth seals 61 are low cost, reliable, dynamic seals that do not normally have rubbing contact which results in long life and little frictional related efficiency losses at the expense of some fluid leakage. A labyrinth seal is normally composed of one or more grooves that are oriented transversely to the leakage flow. As the leakage flow makes the torturous passage by the grooves and the ridges or lips of the labyrinth seal it becomes turbulent. This turbulence severely restricts flow passage and hence there is a reduction in the leakage flow rate.

The rotary elements 48,51, mounted transverse to the ducts 40,41 in this instance as indicated by rotary elements axial centerline 65, are normally cylindrical in shape to ease fabrication as well as to allow easy alignment with normally rectangular shaped inlet and outlet ducting 40,41. However, it is obvious that the rotary elements 48,51 may have other shapes than cylindrical with shapes such as a truncated conical shape, bowed drum shape which has a bigger diameter near the center than at each end, spherical, and other shapes are easily possible. Also, shapes other than rectangular are recognized as feasible for inlet and outlet ducting 40,41.

FIG. 6 shows a cutaway view, as taken through line 6—6 of FIG. 5, that illustrates typical rotary valves 37,38, their rotary elements 48,51 as they are positioned inside of housing 57, various labyrinth seals 61. The gas flow arrows 36 show passage through rotary element openings 59,60 that are shown partially in line and thus forming about a half of a full open valve aperture in this instance.

The rotary element rotation direction arrows 55 show rotation in either direction for either rotary element 48,51 in this example. In the preferred embodiment of the invention, a first rotary element, such as the rotary inner element 48, could be continuously rotating in one direction at a rotational speed equivalent to the pressure pulse spikes, about three cps, in an ACV gas cushion. The second rotary element, outer rotary element 51, could be rotated in either direction as required to set the overall valve aperture size realized during each valve cycle. The housing 57 actually forms a means to help in selection of the aperture size as it can accommodate any part of or all of the opening 60 in the outer rotary element 51.

It is most important to note in FIGS. 5 and 6 that only one of the rotary valve elements 48,51 is required for the valve to function. In such case, the housing 57 acts as a second and only other valve element and sets, in conjunction with the single rotary valve element 48 or 51, the valve fluid flow aperture seen during rotation of the single rotary valve element 48 or 51.

It is also to be noted that, while much of the thrust of the text of this application is directed toward control of gas pressure peaks in gas cushions ACV's, it is quite possible to use these valves 37,38 in all manner of applications. They can be used with all manner of fluids, such as water as well as air, and with granular solids such as sugar and the like.

Figures 7, 8, 9, 10, 11:
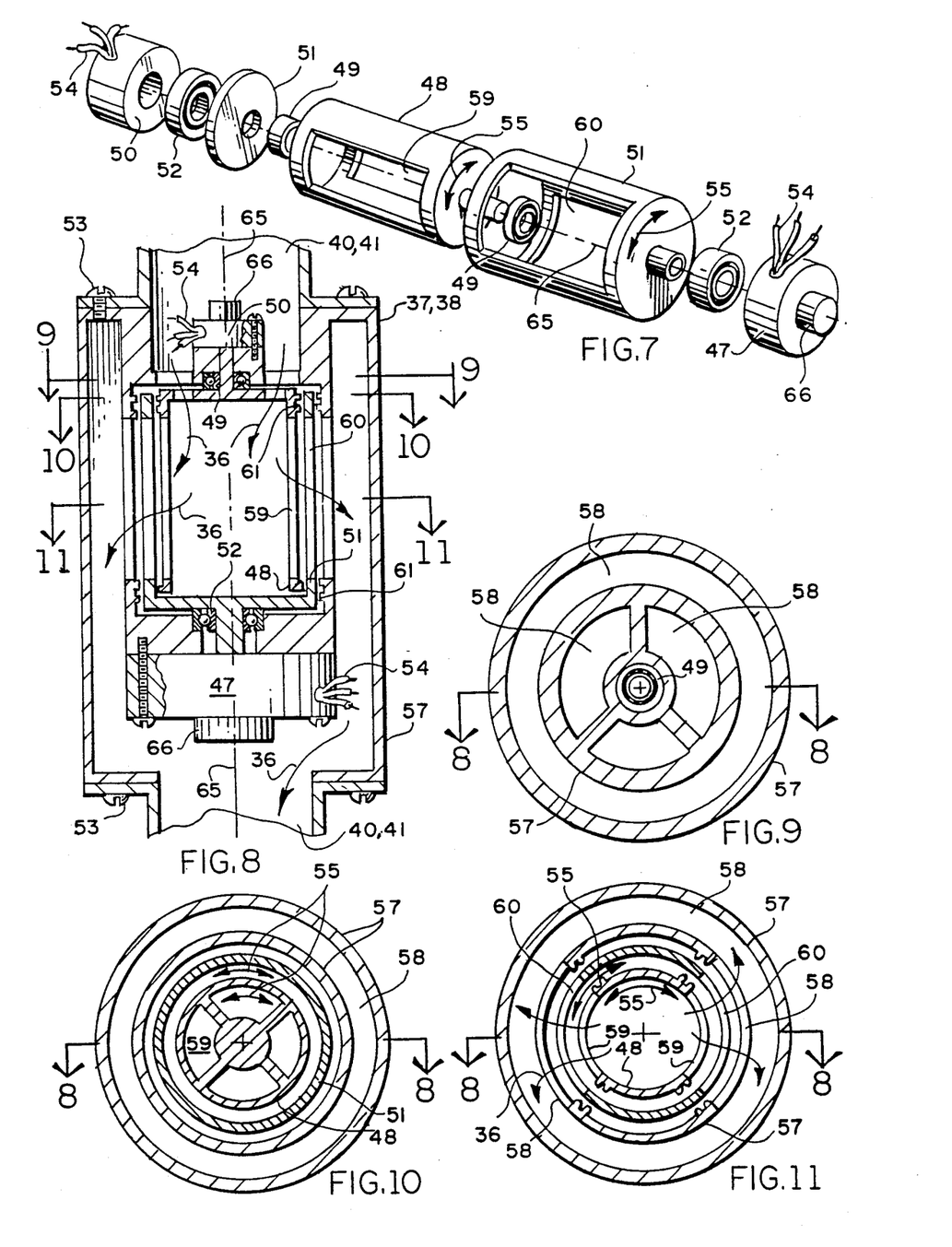
FIG. 7 presents an exploded isometric arrangement of the valve shown in FIGS. 5 and 6. Shown are the movable or rotary portions of the valve including the drumlike rotors including their gas passage openings, rotor drive motors, and bearings.
FIG. 8 presents a cross sectional view of an optional valve concept, as taken through line 8—8 of FIGS. 2 and 3, that is basically axial in orientation to the main gas ducts. In this case, the two rotating elements are inside of a fixed cylindrical housing member. When openings in the two rotary elements and the fixed cylindrical housings are aligned, there is gas flow through the valve as is shown in this view.
FIG. 9 is a cross sectional view, as taken through line 9-9 of FIG. 8, that shows the fixed housing portion of the valve proximal the valve inlet. Also shown are a rotor support bearing.
FIG. 10 offers a cross sectional view, as taken through line 10—10 of FIG. 8, that shows the fixed housing and rotary members just aft of the valve inlet.
FIG. 11 is a cross sectional view, as taken through line 11—11 of FIG. 8, that presents workings of the valve when openings in the rotary members and the fixed housing are aligned and maximum gas flow is underway through the valve.

FIG. 7 presents an exploded view of the valves shown in FIGS. 5 and 6 in isometric layout. Starting on the lower right, shown are a shaft position indicator 66, the inner rotary element drive motor 47, drive motor input/output leads 54, outer rotary element bearing 52, outer rotary element 51 including its opening 60, centerline 65, inner rotor element bearing 49, rotary element rotation direction arrows 55, inner rotary element 48 and its opening 59, inner rotary element bearing 49, end cap portion of outer rotary element 51, outer rotary element bearing 52, and outer rotary element drive motor 50. Seals, such as labyrinth seals, are now shown in this exploded view to simplify the drawing.

FIG. 8 presents an alternative, axially oriented as shown by rotary element axial centerline 65, rotary valve 37,38 configuration as shown in a view taken through line 8-8 of FIGS. 2 and 3. This axially oriented valve 37,38 utilizes and inner rotary element 48 and its opening 59, outer rotary element 51 and its opening 60, inner rotary element drive motor 50 and leads 54, outer rotary element drive motor 47 and leads 54, inner rotary element bearings 49, outer rotary element bearings 52, shaft position indicators 66, and fasteners 53. Also shown are gas flow arrows 36, inlet and outlet ducts 40,41, and valve housing 57.

The operation of the axially oriented valve 37,38 of FIG. 8 is similar to the transverse to the duct valve described in discussions of FIGS. 5, 6, and 7 previously. In this axial case, housing portions are positioned outward of the rotary elements 48,51 to help control gas flow, in the case of the inner housing portion, and to form part of the duct in the case of the outer housing. The use of the optional axially oriented valve 37,38 has advantage in certain situations where space outside of the ducts 40,41 is limited. The transverse to duct orientation valves described in FIGS. 5 and 6 offer the advantage of having motors positioned outside of the ducts which reduces maintenance requirements and also makes servicing easier. Further, it is possible to orient the inlet or discharge ducts 40,41 so that they are at other angles to the valves 37,38 in any of the valve concepts. Also, while the cylindrical rotor element 48,51 design is shown in this axial valve arrangement for simplicity, it is desirable to utilize a truncated cone rotor design with the large end of the cone forward to have maximum flow area forward in a preferred arrangement of an axial layout of the instant invention.

FIG. 9 presents a cutaway view, as taken through line 9-9 of FIG. 8, that shows the housing 57, including housing openings 58, just forward of the rotary elements. This view also includes the inner rotary element, shaft bearing 49.

FIG. 10 is a cutaway view, as taken through line 10-10 of FIG. 8, that shows inner rotary element 48, outer rotary element 51, rotary element rotation direction arrows 55, housing 57, and housing opening 58. This view shows openings 59 in the inner rotary element 48 that are positioned in its end.

FIG. 11 shows a cutaway view, as taken through line 11-11 of FIG. 8, that is located further downstream than the view taken in FIG. 10. This shows inner rotary element 48 opening 59, outer rotary element 51 opening 60, and housing openings 58 as they would be aligned for maximum aperture opening and therefore minimum flow restriction. Gas flow arrows 36 show the direction of gas flow in this instance. Also shown are labyrinth seals 61 and rotary element 48,51 rotation direction arrows 55.

Figures 12, 13, 14, 15, 16:
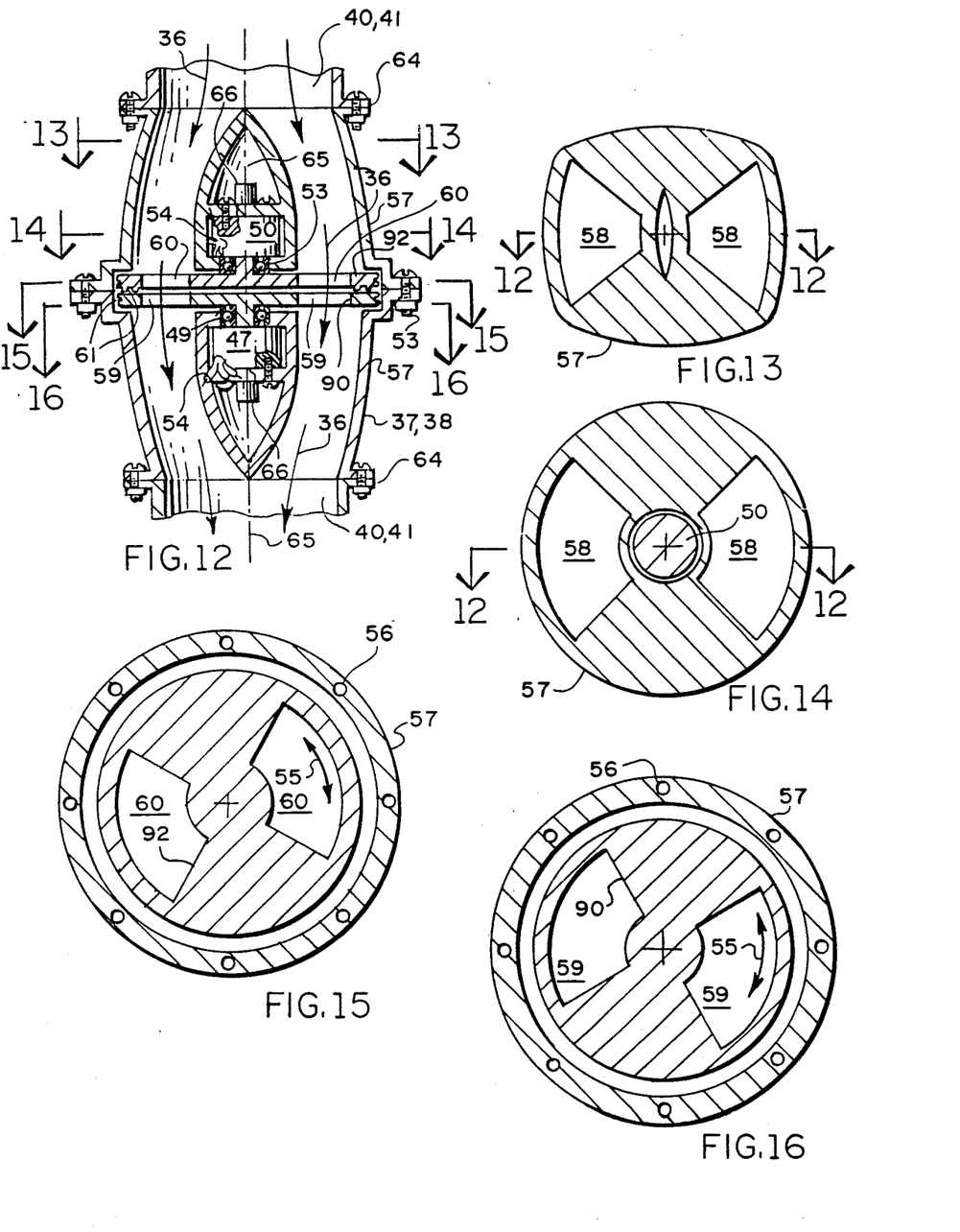
FIG. 12 presents another variation of the valve portion of the instant invention, as taken through line 12—12 of FIGS. 2 and 3, that is probably the simplest arrangement. This involves two simple rotary discs that are driven by simple, in this instance, electric motors. The discs have holes placed such that, when either fully or partially aligned, gas flows through the aperture thus formed in the valve.
FIG. 13 is a cross sectional view, as taken through line 13—13 of FIG. 12, that shows the fixed housing portion of the valve of FIG. 12 as it appears just aft of the valve inlet flange.
FIG. 14 shows a cross sectional view, as taken through line 14—14 of FIG. 12, that shows the fixed housing as it develops further downstream of the valve inlet flange than that shown in FIG. 13. Also shown in FIG. 14 is a rotor drive motor.
FIG. 15 presents a cross sectional view, taken through line 15—15 of FIG. 12, that shows a first rotary disc and its gas flow openings.
FIG. 16 is a cross sectional view, as taken through line 16—16 of FIG. 12, that shows a second rotary disc and openings for gas flow in such disc. Cycling or pulsing gas flow occurs when the openings are aligned.

FIG. 12 shows a cutaway view, as taken through line 12-12 of FIGS. 2 and 3, of a simpler version of the instant invention where rotary elements 90,92 are simple rotary plates or discs. It gives up something for this simplicity, compared to the drum rotor concept presented in FIGS. 5 and 6 for example, in that it presents a smaller aperture at maximum rotary element 90,92 opening alignment. It is possible to increase the size of the aperture by enlarging or bowing out the housing 57, as is shown in FIG. 12 to make the rotary elements 90,92 and therefore their openings 59,60 larger. Although not shown, a further variation of this simple rotary plate version of the instant invention that has little or no aperture area reduction will now be described. In such configuration, the axial centerline of much enlarged rotary elements 90,92 are located outside of ducts 40,41 and the openings 59,60 are at least approximately the same size as the ducts 90,92. In this alternative configuration, the ducts 40,41 are located to one side of the rotary element 48,51 centerline 65 such that they align with the rotary element openings 59,60 during each cycle of the rotary elements 48,51. A further advantage of this alternative configuration is that drive motors 47,50 can be positioned outside of housing 57 for easy servicing.

Other items shown in FIG. 12 are inlet and outlet ducts 40,41, which are normally round in this version of the invention, housings 57, gas flow arrows 36, fasteners 53, rotor drive motors 47,50, motor leads 54, shaft or rotor position indicators 66, labyrinth seals 61, and rotor bearings 49, 52. This version of the instant invention valve 36,38 is designed to be easily installed and removed through parallel flanges 64. As a further point of note, these simple configurations, as other versions of the instant invention, allow for shutting off of the aperture completely so that substantially a zero flow condition exists.

FIG. 13 is a cutaway view, as taken through line 13—13 of FIG. 12, shows the housing 57 and its gas flow openings 58 upstream of the rotors. In this case, the housing is going through a translation in shape from a rectangular shape at the inlet of the duct 40,41.

FIG. 14 presents a cutaway view, as taken through line 14-14 of FIG. 12, that shows the housing further downstream than the housing portion presented in FIG. 13. In such instance, the housing 57 and its openings 58 are tending toward a roundness. Also shown is a motor 50.

FIG. 15 shows a cutaway view, as taken through line 15—15 of FIG. 12, that illustrates the housing 57 with flange bolt holes 56, rotary valve element 92 and its openings 60, and rotor rotation direction arrow 55.

FIG. 16 illustrates a cutaway view, as taken through line 16-16 of FIG. 12, of rotor 90 that is positioned just aft of the rotor shown in FIG. 15. The openings 59 in rotor 90 can be seen to be only partially in line with the rotor 92 openings 60 of FIG. 15. This misalignment of rotor openings 59,60 provides a means to control aperture open timing; however, this simpler variation of the instant invention is not capable of actually varying the aperture size as are the variations that were presented in FIGS. 5 and 6 and FIG. 8. A housing portion that aligns with rotor openings during part of their rotation is normally utilized to provide an aid to aperture adjustment. Also shown in FIG. 16 are a housing 57, housing flange bolt holes 56, and rotor rotation direction arrow 55.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. A fluid control means to reduce water wave generated pressure pulses in a pressurized supporting gas cushion of an air cushion marine vehicle, said pressurized supporting gas cushion supplied with pressurized gas by a gas pressurizing means, comprising: a rotary valve element positioned downstream of the pressurized supporting gas cushion of the air cushion marine vehicle, rotation of the rotary valve element to successively align and misalign openings in said rotary valve element with other openings in said fluid control means resulting in at least partial opening and closing of a passageway that vents the water wave generated pressure pulses from the pressurized support gas cushion, said opening and closing of the passageway controlled by a controller such that opening occurs, during the water wave generated pressure pulses and closing occurs between the water wave generated pressure pulses thereby providing a reduction in the water wave generated pressure pulses and a smoother ride in the air cushion marine vehicle.

2. The fluid control means of claim 1 which further comprises a second rotary valve element containing an opening positioned to, at least partially, control the passageway that vents the water wave generated pressure pulses from the pressurized supporting gas cushion.

3. The air cushion marine vehicle of claim 1 wherein its pressurized supporting gas cushion is, divided into a first and a second portion with said first portion in mechanical communication with the fluid control means and the second portion in mechanical communication with a second fluid control means.

4. The second fluid control means of claim 3 which further comprises an additional rotary valve element.

5. The fluid control means of claim 1 which further comprises a position indicator that indicates positioning of the rotary valve element.

6. The fluid control means of claim 1 wherein the rotary valve element is shaped, as a portion of a conical surface.

7. The fluid control means of claim 1 wherein the rotary valve element is, substantially disc shaped.

8. The fluid control means of claim 1 which further comprises a labyrinth seal.

9. The fluid control means of claim 1 wherein the rotary valve element can rotate in either direction.

10. The controller of claim 1 wherein said controller receives an input determined by pressure of the pressurized supporting gas cushion.

11. The fluid control means of claim 1 wherein the rotary valve element has a rotational centerline that is, disposed external to, and to one side of, a passageway through said fluid control means.

12. A fluid control means to reduce water wave generated pressure pulses in a pressurized supporting gas cushion of an air cushion marine vehicle, said pressurized supporting gas cushion supplied with pressurized gas by a gas pressurization means, comprising: said fluid control means disposed downstream of the pressurized supporting gas cushion of the air cushion marine vehicle, and said fluid control means comprising first and second rotary valve elements proximal to each other and, at least during portions of their operation, individually rotate such that an opening in the first rotary valve element successively aligns and misaligns with an opening in the second rotary valve element resulting in at least partial opening and closing of a passageway in the fluid control means that vents the water wave generated pressure pulses from the pressurized supporting gas cushion, said opening and closing of the passageway controlled by a controller such that the opening occurs during the water wave generated pressure pulses and closing occurs between the water wave generated pressure pulses thereby providing a reduction in the water wave generated pressure pulses in the pressurized supporting gas cushion and a smoother ride in the air cushion marine vehicle.

13. The fluid control means of claim 12 which further comprises a third rotary valve element containing an opening positioned to, control the passageway that vents the water wave generated pressure pulses from the pressurized supporting gas cushion.

14. The fluid control means of claim 12 wherein its pressurized supporting gas cushion is, divided into a first and a second portion with said first portion in mechanical communication with the fluid control means and the second portion in mechanical communication with a second fluid control means.

15. The second fluid control means of claim 14 which further comprises an additional rotary valve element.

16. The fluid control means of claim 12 which further comprises a position indicator that indicates positioning of the first rotary valve element.

17. The fluid control means of claim 12 wherein the first rotary valve element is shaped, as a portion of a conical surface.

18. The fluid control means of claim 12 wherein the second rotary valve element is, substantially disc shaped.

19. The fluid control means of claim 12 which further comprises a labyrinth seal.

20. The fluid control means of claim 12 wherein the first rotary valve element can rotate in either direction.

21. The controller of claim 12 wherein said controller receives an input determined by pressure of the pressurized supporting gas cushion.

22. The fluid control means of claim 12 wherein the first rotary valve element has a rotational centerline that is, disposed external to, and to one side of, a passageway through said fluid control means.

23. A fluid control means to reduce water wave generated pressure pulses in a pressurized supporting gas cushion of an air cushion marine vehicle, said pressurized supporting gas cushion supplied with pressurized gas by a gas pressurizing means, comprising: a rotary valve element positioned upstream of the gas pressurizing means of the air cushion marine vehicle, rotation of the rotary valve element to successively align and misalign openings in said rotary valve element with other openings in said fluid control means resulting in opening and at least partial closing of a passageway that supplies the gas pressurizing means, said opening and closing of the passageway controlled by a controller such that the opening occurs between the water wave generated pressure pulses and the closing occurs during the water wave generated pressure pulses thereby providing a reduction in the water wave generated pressure pulses in the pressurized supporting gas cushion and a smoother ride in the air cushion marine vehicle.

24. The fluid control means of claim 23 which further comprises a second rotary valve element containing an opening positioned to, control the passageway that supplies the gas pressurization means.

25. The air cushion marine vehicle of claim 23 wherein its pressurized supporting gas cushion is, divided into a first and a second portion with said first portion in mechanical communication with the fluid control means and the second portion in mechanical communication with a second fluid control means.

26. The second fluid control means of claim 25 which further comprises an additional rotary valve element.

27. The fluid control means of claim 23 which further comprises a position indicator that indicates positioning of the rotary valve element.

28. The fluid control means of claim 23 wherein the rotary valve element is shaped, as a portion of a conical surface.

29. The fluid control means of claim 23 wherein the rotary valve element is, substantially disc shaped.

30. The fluid control means of claim 23 which further comprises a labyrinth seal.

31. The fluid control means of claim 23 wherein the rotary valve element can rotate in either direction.

32. The controller of claim 23 wherein said controller receives an input determined by pressure of the pressurized supporting gas cushion.

33. The fluid control means of claim 23 wherein the rotary valve element has a rotational centerline that is, disposed external to, and to one side of, a passageway through said fluid control means.

34. A fluid control means to reduce in magnitude water wave generated pressure pulses in a pressurized supporting gas cushion of an air cushion marine vehicle, said pressurized supporting gas cushion supplied with pressurized gas by a gas pressurization means, comprising: said fluid control means positioned upstream of the gas pressurization means of the air cushion marine vehicle and said fluid control means comprising first and second rotary valve elements proximal to each other and, at least during portions of their operation, individually rotate such that an opening in the first rotary valve element successively aligns and misaligns with an opening in the second rotary valve element thereby resulting in partial opening and closing of a passageway in the fluid control means that supplies the gas pressurizing means, said opening and closing of the passageway controlled by a controller such that the opening occurs between the water wave generated pressure pulses and the closing occurs during the water wave generated pressure pulses thereby providing a reduction in the water wave generated pressure pulses in the pressurized supporting gas cushion and a smoother ride in the air cushion marine vehicle.

35. The fluid control means of claim 34 which further comprises a third rotary valve element containing an opening positioned to, control the passageway that supplies the gas pressurization means.

36. The air cushion marine vehicle of claim 34 wherein its pressurized supporting gas cushion is, divided into a first and a second portion with said first portion in mechanical communication with the fluid control means and the second portion in mechanical communication with a second fluid control means.

37. The second fluid control means of claim 36 which further comprises an additional rotary valve element.

38. The fluid control means of claim 34 which further comprises a position indicator that indicates positioning of the first rotary valve element.

39. The fluid control means of claim 34 wherein the first rotary valve element is shaped, at least in part, as a portion of a conical surface.

40. The fluid control means of claim 34 wherein the second rotary valve element is shaped, substantially disc shaped.

41. The fluid control means of claim 34 which further comprises a labyrinth seal.

42. The fluid control means of claim 34 wherein the first rotary valve element can rotate in either direction.

43. The controller of claim 34 wherein said controller receives an input determined by pressure of the pressurized supporting gas cushion.

44. The fluid control means of claim 34 wherein the first rotary valve element has a rotational centerline that is, at least in its majority, disposed external to, and to one side of, a passageway through said fluid control means.

45. A first and a second fluid control means to reduce water wave generated pressure pulses in a pressurized supporting gas cushion of an air cushion marine vehicle, said pressurized supporting gas cushion supplied with pressurized gas by a gas pressurizing means, comprising: said first fluid control means comprising a first rotary valve element with said first fluid control means positioned downstream of the pressurized supporting gas cushion of said air cushion marine vehicle, operation of said first fluid control means such that rotation of said first rotary valve element successively aligns and misaligns openings in said first rotary valve element with other openings in said first fluid control means, said second fluid control means comprising a second rotary valve element with said second fluid control means positioned upstream of the gas pressurizing means of said air cushion marine vehicle, operation of said second fluid control means such that rotation of said second rotary valve element successively aligns and misaligns openings in said second rotary valve element with other openings in said second fluid control means, and a controller that controls operation of the first and the second fluid control means which results in a decrease in the water wave generated pressure pulses in the pressurized supporting gas cushion and a smoother ride in the air cushion marine vehicle.

46. The first fluid control means of claim 45 which further comprises another rotary valve element containing an opening positioned to, control the passageway that vents the water wave generated pressure pulses from the pressurized supporting gas cushion.

47. The second fluid control means of claim 45 which further comprises another rotary valve element containing an opening positioned to, control the passageway that supplies the gas pressurization means.

48. The air cushion marine vehicle of claim 45 wherein its pressurized supporting gas cushion is, divided into a first and a second portion with said first portion in mechanical communication with the first fluid control means and the second portion in mechanical communication with a third fluid control means.

49. The first fluid control means of claim 45 which further comprises a position indicator that indicates positioning of the first rotary valve element.

50. The second fluid control means of claim 45 which further comprises a position indicator that indicates positioning of the second rotary valve element.

51. The first fluid control means of claim 45 wherein the first rotary valve element is shaped, at least in part, as a portion of a conical surface.

52. The second fluid control means of claim 45 wherein the second rotary valve element is shaped, as a portion of a conical surface.

53. The first fluid control means of claim 45 wherein the rotary valve element is, at least in part, substantially disc shaped.

54. The second fluid control means of claim 45 wherein the rotary valve element is, at least in part, substantially disc shaped.

55. The first fluid control means of claim 45 which further comprises a labyrinth seal.

56. The second fluid control means of claim 45 which further comprises at least a portion of a labyrinth seal.

57. The first fluid control means of claim 45 wherein the first rotary valve element can rotate in either direction.

58. The second fluid control means of claim 45 wherein the second rotary valve element can rotate in either direction.

59. The controller of claim 45 wherein said controller receives an input determined by pressure of the pressurized supporting gas cushion.

60. The first rotary valve element of claim 45 wherein first rotary valve element has a rotational centerline that is, disposed external to, and to one side of, a passageway through said first fluid control means.

61. The second rotary valve element of claim 45 wherein the second rotary valve element has a rotational centerline that is, disposed external to, and to one side of, a passageway through said second fluid control means.

* * * * *